May 26, 1936.   R. B. LEWIS   2,042,231
TORSION TESTING MECHANISM
Filed Aug. 16, 1934   2 Sheets-Sheet 1

INVENTOR
ROBERT B. LEWIS.
BY
ATTORNEY

May 26, 1936.   R. B. LEWIS   2,042,231
TORSION TESTING MECHANISM
Filed Aug. 16, 1934   2 Sheets-Sheet 2
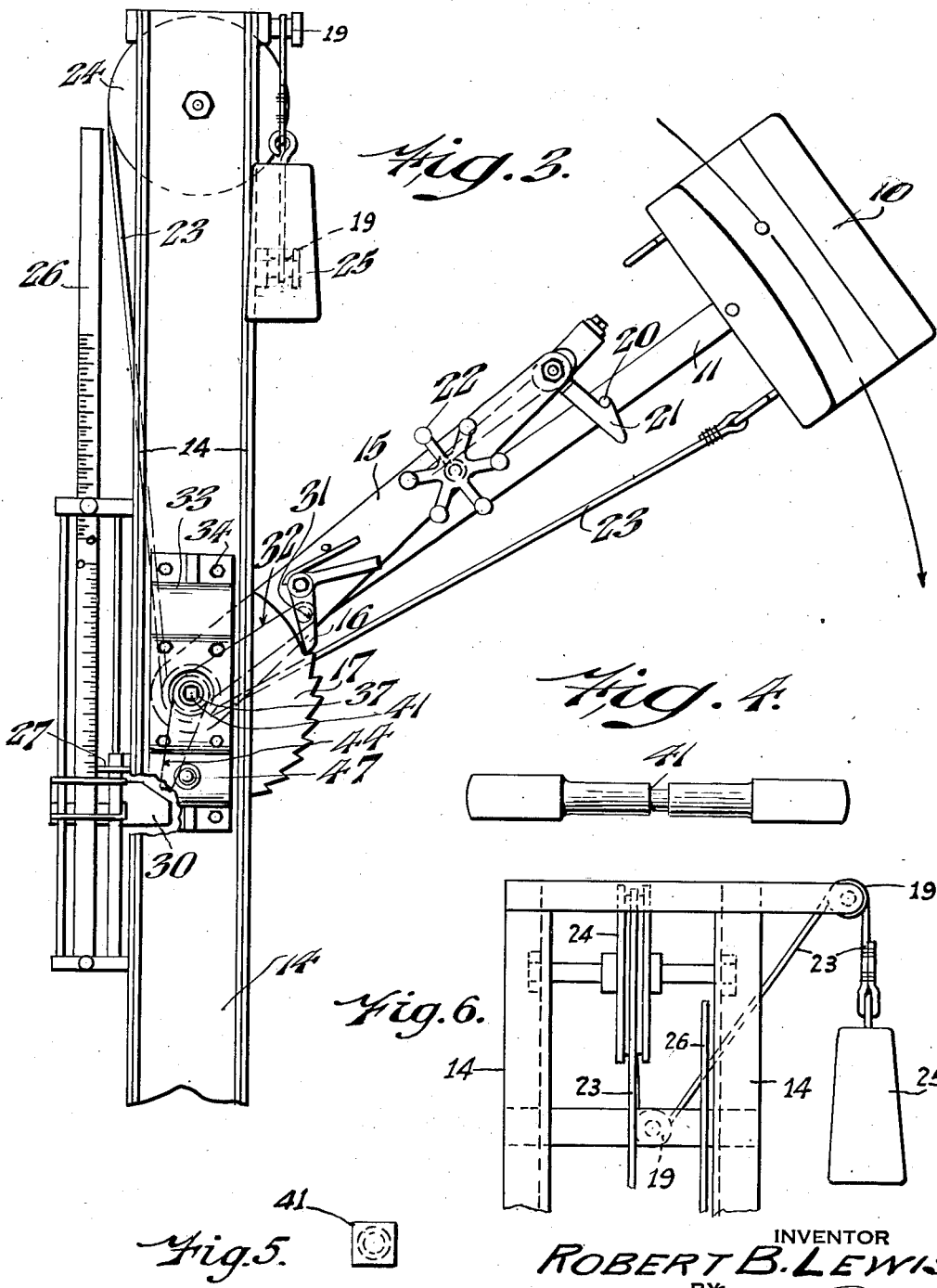
INVENTOR
ROBERT B. LEWIS,
BY
Robert M. Barr
ATTORNEY

Patented May 26, 1936 2,042,231

UNITED STATES PATENT OFFICE 2,042,231

TORSION TESTING MECHANISM

Robert B. Lewis, Philadelphia, Pa., assignor to Tinius Olsen Testing Machine Company, Philadelphia, Pa., a corporation of Pennsylvania Application August 16, 1934, Serial No. 740,149

6 Claims. (Cl. 265—13)

The present invention relates to a testing machine and more particularly to a machine for making torsion tests.

Some of the objects of the present invention are to provide an attachment for pendulum operated impact testing machines whereby said machine or machines can be operated for torsion tests; to provide a torsion testing mechanism wherein the piece to be tested is fixedly mounted at both ends in rotatable parts, both of which are arranged to be set into motion by the swinging of a pendulum; to provide a mechanism for stopping the rotation of one end of a test piece while the opposite end continues to rotate under the movement of a swinging pendulum and whereby the test piece is subjected to a torsion test; to provide in connection with a pendulum impact mechanism means for obtaining a direct reading of the energy used in carrying out a torsion test.

Figure 1:
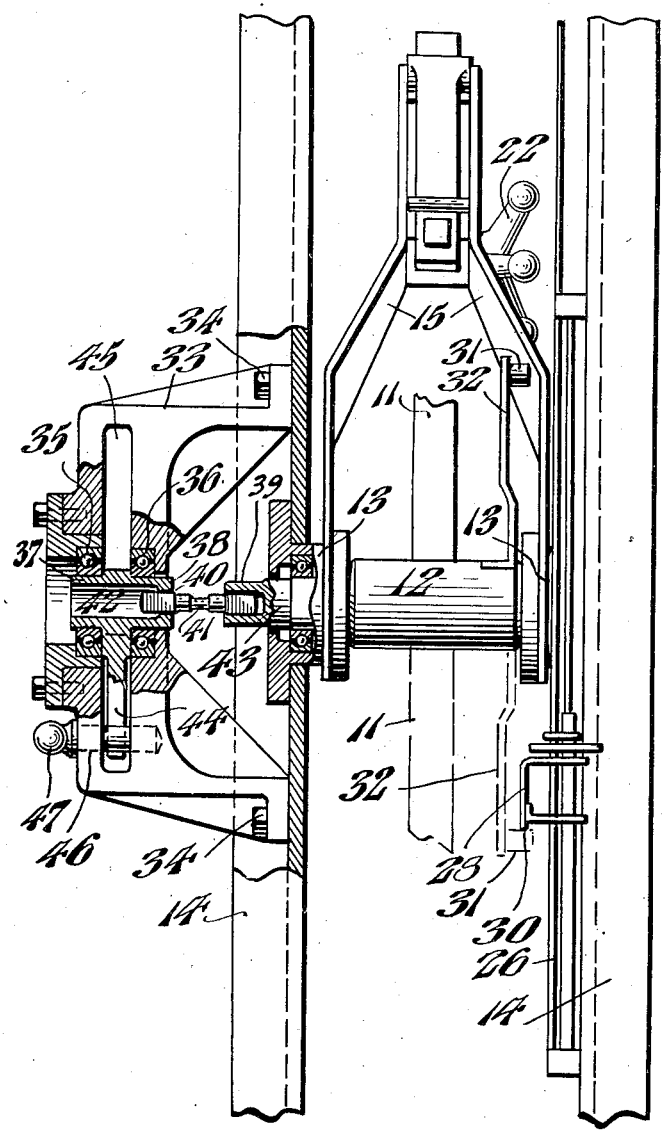
Figure 2:
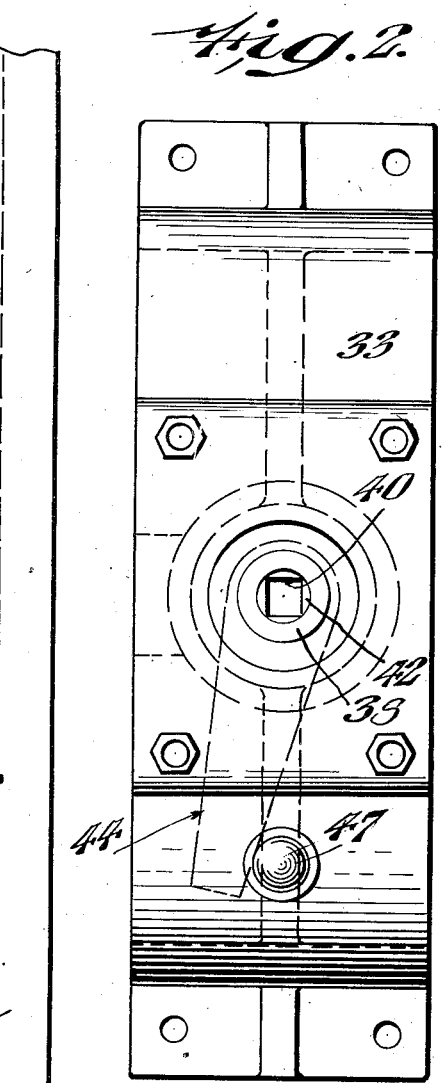

In the accompanying drawings Fig. 1 represents a front elevation in part section of a portion of a pendulum impact testing machine embodying one form of the present invention; Fig. 2 represents a side elevation of the same taken from the torsion attachment side; Fig. 3 represents a side elevation on a reduced scale of the pendulum impact mechanism and associated parts; Fig. 4 represents a side elevation of one form of test specimen; Fig. 5 represents an end elevation of the same, and Fig. 6 represents a detail in front elevation of the upper portion of the machine which is cut away in Fig. 1.

Referring to the drawings one form of the present invention is shown as assembled as an attachment for a pendulum impact testing machine of the general character shown and described in United States Letters Patent No. 1,780,696. In this type of machine a pendulum weight 10 is mounted for free swinging movement by having its arm 11 fast to a stub shaft 12 which is preferably freely rotatable in ball bearings 13. These bearings 13 are respectively supported in the rigid side frame bars 14 of the machine and the arrangement is such that the pendulum 10 and its arm 11 can swing between the bar 14 for impact tests. A bi-furcated arm straddles the hub part of the pendulum 11 and is mounted coaxially of the shaft 12 for movement relative thereto when desired. This arm 15 by its angular adjustment determines the initial or selected height from which the pendulum is to drop, the attachment being made possible by a spring pressed pawl 16 carried by the arm 15 in position to engage a rigid segment 17 which is fast to one of the bars 14. With this height adjustment fixed in this selected position, the arm 15 becomes a rigid support holding the pendulum rod 11 in the selected position because of a fixed pin 20 on the rod 11 and a releasable catch 21 pivoted to the arm 15. A hand mechanism 22 is arranged to control the operation of the latch 21. A take-up rope 23, pulley 24 and weight 25 are provided to stop the swing of the pendulum after it has completed its test or impact stroke. The rope 23 running over the pulley 24 and about guide wheels 19 under the action of the falling weights 25 snubs the return of the pendulum. The indicating mechanism from which the impact energy can be read directly consists of a vertically mounted scale 26 arranged for adjustment for zero setting and having a movable pointer or index 27 which is actuated by an attached part 28 having a straight edge 30 located in the path of a roller 31. The scale 26 is set to zero by locating the zero point of the scale in alinement with the position of rest of the index 27 after a free swing of the pendulum. A radially disposed arm 32 fast to the shaft 12 carries the roller 31 so that the latter picks up the edge 30 at the moment of impact and thus causes the index 37 to rise to the position corresponding to the developed energy.

For the purpose of making the torsion test a yoke 33 is arranged to be secured by bolts 34, or other fastening means, to one of the frame bars 14 to form a support for a pair of ball bearings 35 and 36, which locate a hub 37 coaxially with respect to the shaft 12. As shown the hub 37 is of tubular form terminating at one end in a closure 38 having a polygonal opening 40 therein of a size and shape to snugly receive one end of a test specimen 41 so that one part will transmit rotation to the other and both will rotate in the bearings 35 and 36. Also the tubular construction of the hub 37 forms a bore 42 of greater diameter than the diameter of the test specimen and therefore the latter can be inserted endwise through the hub and take its proper position for test purposes. The opposite end of the test specimen is also mounted for rotation and in this instance a holder 43 is provided which is formed as an extension of the shaft 12. This holder 43 has a polygonal socket 39 for receiving and anchoring that end of the test specimen 41. The socket 39 is shaped to conform to the polygonal end of the test specimen so that the latter can rotate with the shaft 12 and the holder 43 but has no turning movement relative thereto.

In order to bring one end of the rotating specimen to rest so that a torque is applied to the specimen, the hub 42 is provided with a radially disposed arm 44 which is free to swing within an annular slot 45 in the yoke 33. At the point in the rotation of the hub 42, arm 44 and test specimen 41 where the impact is to take place, the yoke 33 is provided with a hole 46 which extends through opposite sides of the passage 45 and is adapted to receive a pin 47. The hole 46 is at a less radial distance from the axis of the hub 42 than the length of the arm 44 so that the latter is caused to strike the pin during its rotary movement.

In carrying out a torsion test, a test specimen 41 is inserted axially through the bore 42 until its two ends are seated respectively in the anchoring apertures of the hub 37 and the holder 43. As so assembled the test specimen is fixed against relative movement with respect to both of the parts but any movement of the shaft 12 will cause the test piece 41 and the hub 42 to rotate therewith. Therefore when the pendulum is swung to its uppermost position, or the position selected for a particular length of pendulum swing, the arm 44 will also be raised to a corresponding elevated position. When so raised the latch 21 will engage the pin 20 and hold the pendulum 10 and its associated parts until it is desired to release it for an impact stroke. When the hand wheel 22 is turned to release the latch 21 the pendulum swings downwardly, rotating the shaft 12 and causing a simultaneous rotation of the test specimen 41 with its attached hub and arm 44. When the arm 44 strikes the pin 47 a torsional force will be applied to the specimen 41 and the loss of energy due to the resistance of the test piece is then readable by the position of the indicator or index 27. It should be noted since the arm 44 is carried by the hub 37 which is supported on self-aligning ball bearings 35 and 36 at opposite sides of the plane of rotation of the arm 44, that any forces which are not truly rotational will be absorbed and therefore not introduce errors due to bending or otherwise into the reading. In other words should any unbalanced forces be developed in breaking the specimen they will be absorbed in the bearing without having any disturbing effect on the specimen. This ensures the specimen being subjected to torsional stresses only. Furthermore since the impact takes place between a single arm and one fixed point there is no chance of other than torsional stresses being imparted to the specimen. This is not true of the type of machine wherein the specimen is mounted with a free end having a cross bar arranged to be struck at opposite sides by dogs on a moving element because it is extremely difficult to so coordinate the parts that the dogs simultaneously engage the cross bar.

Attention is further directed to the important fact that by the use of a pendulum it is possible to read directly on the scale the amount of energy consumed in performing the test. This is impossible in the type of machine wherein a constantly rotating type of impact mechanism is employed. In such machines the test result must be computed from the velocity at moment of impact.

While only a single form is shown in which this invention may be embodied, it is to be understood that the invention is not limited to any specific construction, but might be applied to various forms without departing from the spirit of the invention or the scope of the appended claims.

Having thus described my invention, I claim:—

1. A torsion test apparatus comprising a rotatable holder for one end of a test specimen, means to connect said end to said holder to rotate therewith, a shaft associated with said holder to cause rotation thereof, a rotatably mounted member arranged to be rotated by the opposite end of said specimen, a momentum mechanism for rotating said shaft, and impact means for stopping the rotation of said member while said mechanism is operating, whereby said specimen is subjected to a torsion test.

2. A torsion test apparatus comprising a rotatable holder for one end of a test specimen, means to connect said end to said holder to rotate therewith, a shaft associated with said holder to cause rotation thereof, a rotatably mounted member arranged to be rotated by the opposite end of said specimen, a momentum mechanism for rotating said shaft, and impact means including a removable pin for stopping the rotation of said member while said mechanism is operating, whereby said specimen is subjected to a torsion test.

3. A torsion test apparatus comprising a rotatable holder for one end of a test specimen, means to connect said end to said holder to rotate therewith, a shaft associated with said holder to cause rotation thereof, a rotatably mounted member arranged to be rotated by the opposite end of said specimen, a momentum mechanism including a pendulum for rotating said shaft, and impact means for stopping the rotation of said member while said pendulum is swinging, whereby said specimen is subjected to a torsion test.

4. A torsion test apparatus comprising a rotatable holder for one end of a test specimen, means to connect said end to said holder to rotate therewith, a shaft associated with said holder to cause rotation thereof, a rotatably mounted member arranged to be rotated by the opposite end of said specimen, a momentum mechanism for rotating said shaft, an arm projecting from said member, and a stop located in the path of movement of said arm for transmitting a torque to said specimen at a predetermined point in the operation of said momentum mechanism.

5. A torsion test apparatus comprising a rotatable holder for one end of a test specimen, means to connect said end to said holder to rotate therewith, a shaft associated with said holder to cause rotation thereof, a rotatably mounted member arranged to be rotated by the opposite end of said specimen, a momentum mechanism for rotating said shaft, an arm projecting from said member, and a pin removably mounted in the path of movement of said arm for transmitting a torque to said specimen at a predetermined point in the operation of said momentum mechanism.

6. A torsion test apparatus comprising the combination of a frame, a shaft rotatably mounted on said frame, a holder for one end of a test specimen attached to said shaft for causing said specimen to rotate, a yoke attached to said frame having a bearing coaxially arranged with respect to said shaft, a member rotatably mounted in said bearing and connected to the other end of said specimen for rotation with said specimen, an arm projecting from said member, a stop fixed in the path of said arm, and a pendulum attached to said shaft for causing said arm to strike said stop and impart a torque to said specimen while said pendulum is swinging.

ROBERT B. LEWIS.